March 8, 1927.
R. KLABOE
COMBINATION TOOL
Filed Aug. 12, 1925
1,620,262
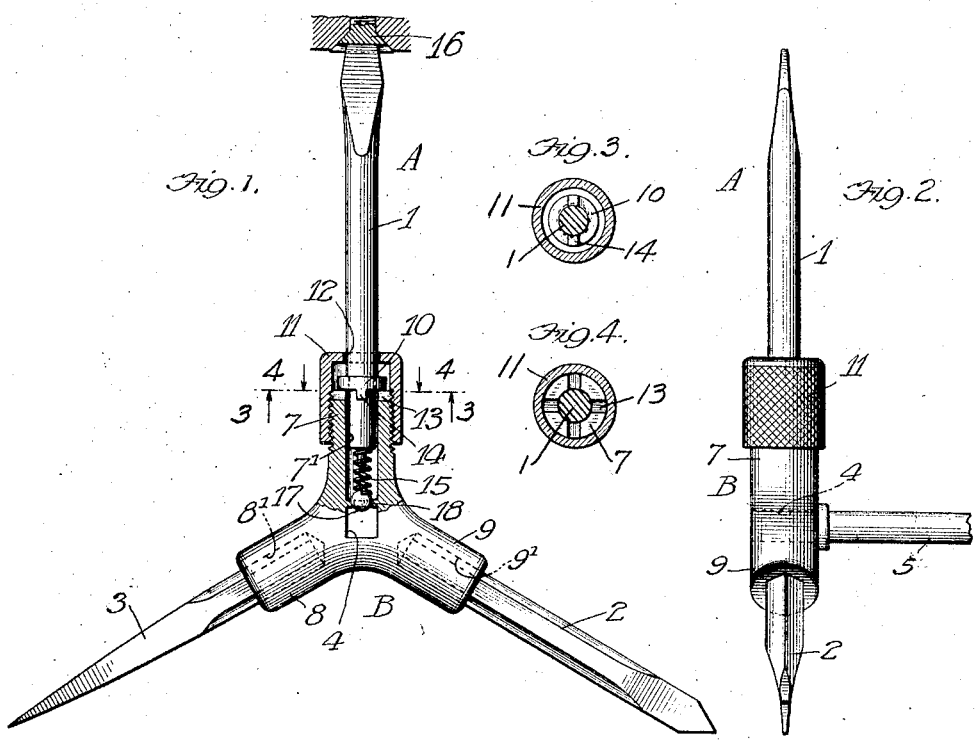
Witness
Martin H. Olsen
Inventor
Ralph Klaboe
By Geo. E. Waldo
Atty.

Patented Mar. 8, 1927.

1,620,262

UNITED STATES PATENT OFFICE.

RALPH KLABOE, OF CHICAGO, ILLINOIS.

COMBINATION TOOL.

Application filed August 12, 1925. Serial No. 49,760.

This invention relates to combination tools.

The object of the invention is to provide a combination tool adapted for manual manipulation, which comprises not less than three different tools adapted for different kinds of service, in which all of said tools, excepting one, are adapted to form a handle for manipulating the remaining tool; which will be simple in construction, strong, and durable, which may be manufactured at relatively small cost, and which provides a handle by means of which great force or power may be applied to a tool in operation.

In the accompanying drawing, in which my invention is fully illustrated,

Fig. 1 is a plan view, partly in section, of a combination tool embodying my invention and improvements;

Fig. 2 is a view thereof, from the right side of Fig. 1; and

Figs. 3 and 4 are sectional views on the lines 3—3 and 4—4 of Fig. 1, looking in the directions respectively indicated by the arrows.

Describing the invention with particular reference to the drawings, my improved combination tool, designated as a whole A, consists of three separate tools 1, 2, and 3.

As shown, all of said tools are different from each other, the tool 1 being a screw-driver, the tool 2 a countersink, and the tool 3 a penetrating tool or reamer for driving holes in wood or the like, or enlarging holes in metal. I do not, however, desire to limit myself to a combination tool comprising the particular tools shown, as said tools are shown for the purpose of illustration only and exemplify any combination of tools desired.

The separate tools 1, 2, and 3 are secured in a suitable holder or body portion B consisting of arms 7, 8, and 9, preferably formed integral with each other, which diverge from one another at angles of substantially 120 degrees, and which are provided in their ends with holes or sockets 7', 8', and 9' adapted to receive the ends of the shanks of tools 1, 2, and 3.

The arms 7, 8, and 9 and also the holes or sockets 7', 8', and 9' may conveniently be made round in cross-section. The countersink 2 and the penetrating tool or reamer 3 will preferably be made of hexagonal tool steel rigidly secured in their respective sockets in the arms 9 and 8 by being forced into said sockets, which are made slightly smaller than the large diameters of said tool shanks.

As previously stated, the end of the shank of the screw-driver 1 is fitted to the hole or socket 7' in the arm 7 so as to turn therein. Said tool is maintained in engagement with its bearing by a collar 10 on the shank of said screw-driver and by a gland 11, which has screw-threaded engagement with the end of said arm 7 and is provided with an opening 12 which forms an outer bearing for the tool 1, between which and the end of the arm 7 the collar 10 is confined.

Formed in the end of the arm 7 are grooves 13 with which a tongue 14 on the collar 10 is adapted to engage, the outer end of the gland 11 in which the bearing 12 is formed being spaced a sufficient distance from the end of the arm 7 to permit movement of the collar 10 to effect engagement and disengagement of the tongue 14 with and from the grooves 13. The tool 1 is maintained normally in extended position—corresponding to disengagement of the tongue 14 from the grooves 13—by a spring 15 which reacts between the end of the shank of the tool 1 and the bottom of the socket bearing 7'.

With the described construction, it is obvious that pressure on the arms 8 and 9 and the tools 2 and 3, in manipulating the screw-driver 1, will compress the spring 15 and will effect engagement of the tongue 14 on the collar 10 with the grooves 13 in the end of the arm 7, whereby turning movement of the tool A about the axis of the screw-driver 1, will impart turning movement to said screw-driver. As shown, the sides of the grooves 13 and of the tongue 14 are parallel, thus providing for turning the screw-driver 1 in either direction, as it may be desired to screw up or unscrew a screw.

In operation, the screw-driver 1 is alternately subjected to pressure to compress the spring 15 and effect engagement of the tongue 14 with the grooves 13, and released to effect disengagement of said tongue from said grooves, thus providing for step by step rotation of the screw-driver 1, to turn the screw in either direction, as may be desired, in an obvious manner.

As shown in Fig. 1, the screw-driver 1 is shown as applied in use for driving a screw, indicated at 16, the spring 15 being compressed and the tongue 14 in engagement with a groove 13.

As shown, also, the body or handle portion B of the tool is provided with a square hole or opening 4, positioned substantially at the intersection of the axes of the tools 1, 2, and 3, which is adapted to interchangeably receive the correspondingly shaped ends of other tools, one of which is indicated at 5, Fig. 2.

The end of the tool 5 is adapted to be secured in frictional engagement with the hole 4 by means of a ball 17 seated in a hole or opening 18 formed in the end wall of the bearing socket 7' for the tool 1, the relation being such that the ball 17 will project through said wall into said hole 4, said ball being maintained yieldingly in operative position by a spring applied thereto. As shown, said ball 17 is thus maintained in extended position by the spring 15, which reacts between said ball and the inner end of the shank of the tool 1.

With the described construction it is obvious that when the shank of a tool 5 is forced into the hole 4, the pressure exerted on the ball 17 by the spring 15 will force the shank of said tool 5 into frictional engagement with the side of the hole 4 opposite to the ball 17, the strength of such frictional engagement corresponding to the strength of said spring.

I claim:—

1. A combination tool comprising a body portion provided with a plurality of sockets, and individual tools secured in said sockets, the relation being such that said individual tools will diverge from one another and any two of them with said body portion will form a handle for manipulating another tool, said combination tool comprising an individual tool secured in its socket so as to be rotatable and endwise movable, a clutch adapted for locking said tool to and releasing it from said body portion, endwise movement of said tool produced by pressure on said tool in operation effecting engagement of said clutch, and a spring applied to said tool adapted to impart endwise movement thereto to disengage said clutch.

2. A combination tool as specified in claim 1, in which the clutch consists of an interlocking tongue and groove formed on said individual tool and body portion, respectively.

3. A combination tool as specified in claim 1, in which the means for securing said rotatable and endwise movable individual tool in its socket comprises a collar on the shank of said individual tool and a gland secured to the body portion of the combination tool, between the outer end of which and a seat on said body portion the collar on said individual tool is confined.

4. A combination tool as specified in claim 1, in which the means for securing said rotatable and endwise movable individual tool in its socket comprises a collar on the shank of said individual tool and a gland secured to the body portion of the combination tool, between the outer end of which and a seat on said body portion the collar on said individual tool is confined, and the clutch for securing said individual tool against rotation comprises a tongue on said collar adapted to engage a slot formed in the body portion of the tool.

5. A combination tool as specified in claim 1, in which the body portion of the combination tool is provided with a hole adapted to removably and interchangeably receive other individual tools, said hole extending substantially at right angles to the axes of the other individual tools, and means for removably securing a tool in said hole, comprising a ball seated in a hole or opening formed in the end wall of the bearing socket for a rotatable and endwise movable individual tool, the relation being such that said ball will project into the hole for said fourth tool, and a spring which reacts between said ball and the inner end of the rotatable and endwise movable individual tool.

In testimony that I claim the foregoing as my invention, I affix my signature this 7th day of August, 1925.

RALPH KLABOE.